(12) United States Patent
Cavagna

(10) Patent No.: US 6,948,519 B2
(45) Date of Patent: Sep. 27, 2005

(54) DEVICE FOR REGULATING THE FLOW OF GAS TOWARD USER EQUIPMENT

(75) Inventor: Savio Cavagna, Ponte S. Marco di Calcinato (IT)

(73) Assignee: Cavagna Group Societa' per Azioni, Ponte S. Marco di Calcinato (IT)

(*) Notice: Subject to any disclaimer, the term of this patent is extended or adjusted under 35 U.S.C. 154(b) by 174 days.

(21) Appl. No.: 10/364,646

(22) Filed: Feb. 12, 2003

(65) Prior Publication Data
US 2004/0040600 A1 Mar. 4, 2004

(30) Foreign Application Priority Data
Sep. 3, 2002 (IT) ...................................... MI2002A1879

(51) Int. Cl.[7] .............................................. G05D 16/02
(52) U.S. Cl. .............................. 137/505.12; 137/116.3; 137/505.46; 137/517
(58) Field of Search ..................... 137/505.12, 505.46, 137/517, 460, 116.3

(56) References Cited

U.S. PATENT DOCUMENTS

| | | | | |
|---|---|---|---|---|
| 2,867,234 A | * | 1/1959 | Billington | ................ 137/116.5 |
| 4,105,044 A | * | 8/1978 | Davitt | ........................ 137/517 |
| 5,203,371 A | * | 4/1993 | Teay | .......................... 137/460 |
| 5,456,281 A | | 10/1995 | Teay | |

FOREIGN PATENT DOCUMENTS

| | | |
|---|---|---|
| EP | 0 944 291 | 4/2000 |
| FR | 2 811 399 | 1/2002 |
| GB | 358 260 | 10/1931 |

* cited by examiner

Primary Examiner—Stephen M. Hepperle
(74) Attorney, Agent, or Firm—Guido Modiano; Albert Josif; Daniel O'Byrne

(57) ABSTRACT

A device for regulating a flow of gas toward user equipment, which comprises a first regulation stage and a second regulation stage arranged downstream in a direction of flow of the gas to be controlled, further comprising a flow limiter interposed between the first and second regulation stages and adapted to intervene if the second stage malfunctions.

6 Claims, 4 Drawing Sheets

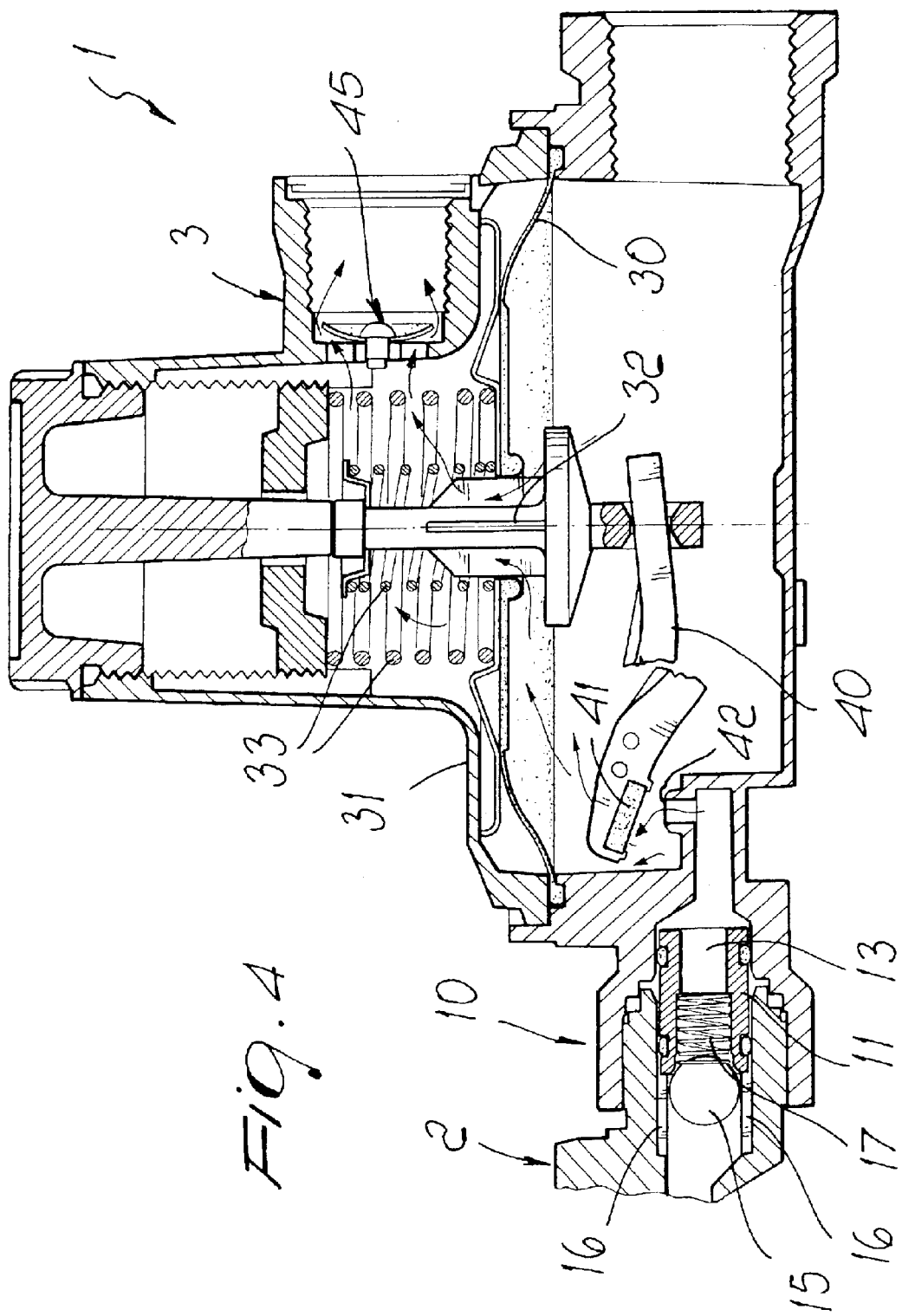

DEVICE FOR REGULATING THE FLOW OF GAS TOWARD USER EQUIPMENT

BACKGROUND OF THE INVENTION

The present invention relates to a device for regulating the flow of gas toward user equipment.

As is known, in order to regulate the pressure of the flow of gas toward user equipment, regulation devices have long been used which generally have a first regulation stage, normally located outside the building, downstream of which a second regulation stage is placed.

With the current situation, in case of failure or malfunction of the second regulation stage, the gas is sent, by means of a venting valve, toward a discharge port that is different from the outlet port for connection to the user equipment.

In current conditions, in case of malfunction the entire flow of gas is in practice dispersed, with obvious damage both as regards the economical aspect and as regards the occurrence of potential dangers.

SUMMARY OF THE INVENTION

The aim of the invention is to solve the problem described above by providing a device for regulating the flow of gas toward user equipment, of the type with two regulation stages in succession, which in case of malfunction is capable of reducing significantly the amount of gas that is released, so as to achieve a considerable reduction of waste and an increase in safety.

Within this aim, an object of the invention is to provide a regulation device that allows to increase safety conditions considerably, without thereby having to resort to complicated apparatuses.

Another object of the present invention is to provide a regulation device that thanks to its particular constructive characteristics is capable of giving the greatest assurances of reliability and safety in use.

Another object of the present invention is to provide a device for regulating the flow of gas toward user equipment that can be obtained easily starting from commonly commercially available elements and materials and is further competitive from a merely economical standpoint.

This aim and these and other objects that will become better apparent hereinafter are achieved by a device for regulating the flow of gas toward user equipment, according to the invention, comprising a first regulation stage and a second regulation stage arranged downstream in a direction of flow of the gas to be controlled, characterized in that it comprises a flow limiter interposed between said first and second regulation stages and adapted to intervene if said second stage malfunctions.

BRIEF DESCRIPTION OF THE DRAWINGS

Further characteristics and advantages will become better apparent from the description of a preferred but not exclusive embodiment of a device for regulating the flow of gas toward user equipment, illustrated only by way of non-limitative example in the accompanying drawings, wherein:

FIG. 4 is a view of the second regulation stage in failure conditions.

DESCRIPTION OF THE PREFERRED EMBODIMENTS

Figure 1:
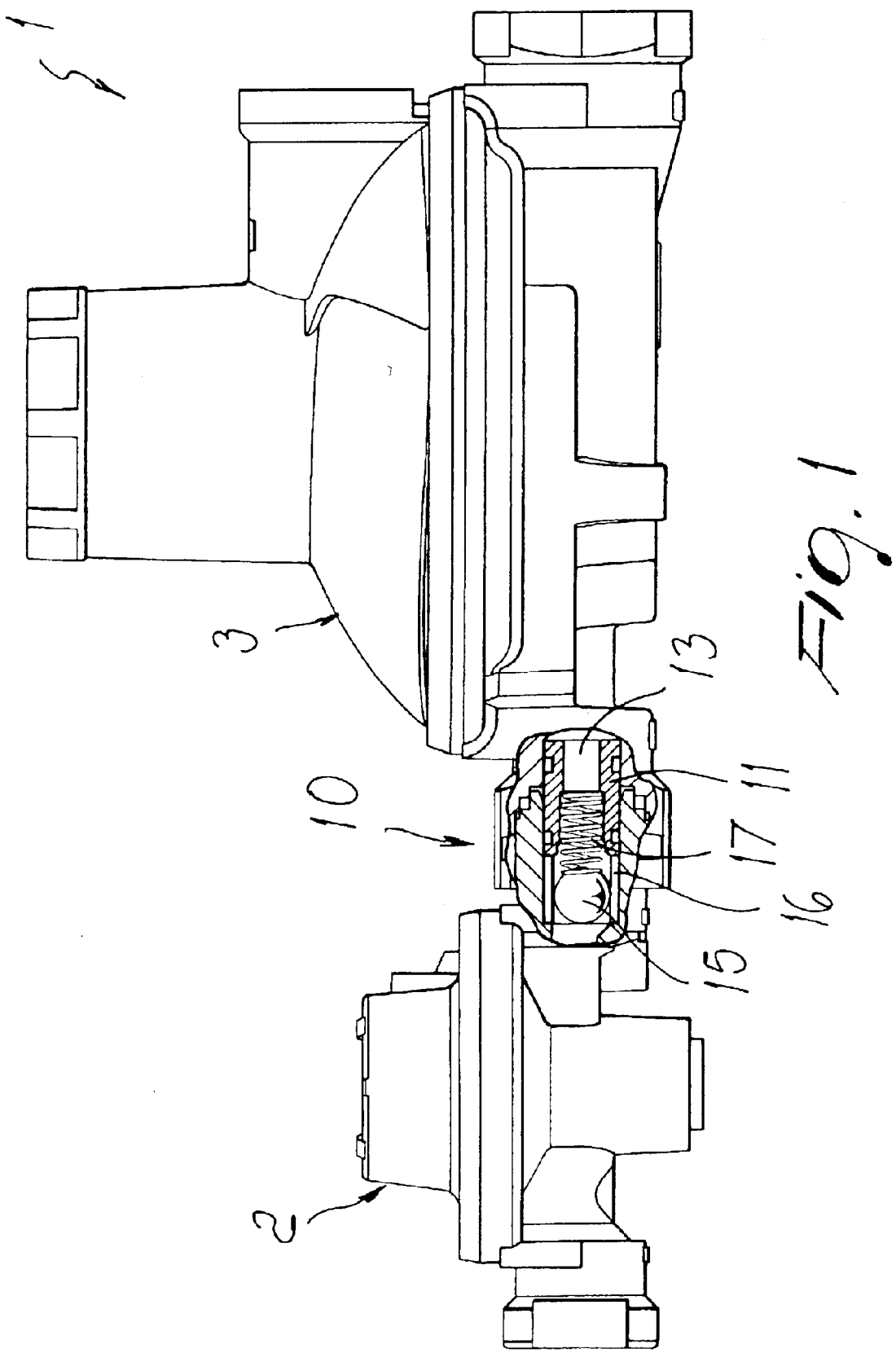
FIG. 1 is a schematic view of the regulation device according to the invention.
Figure 2:
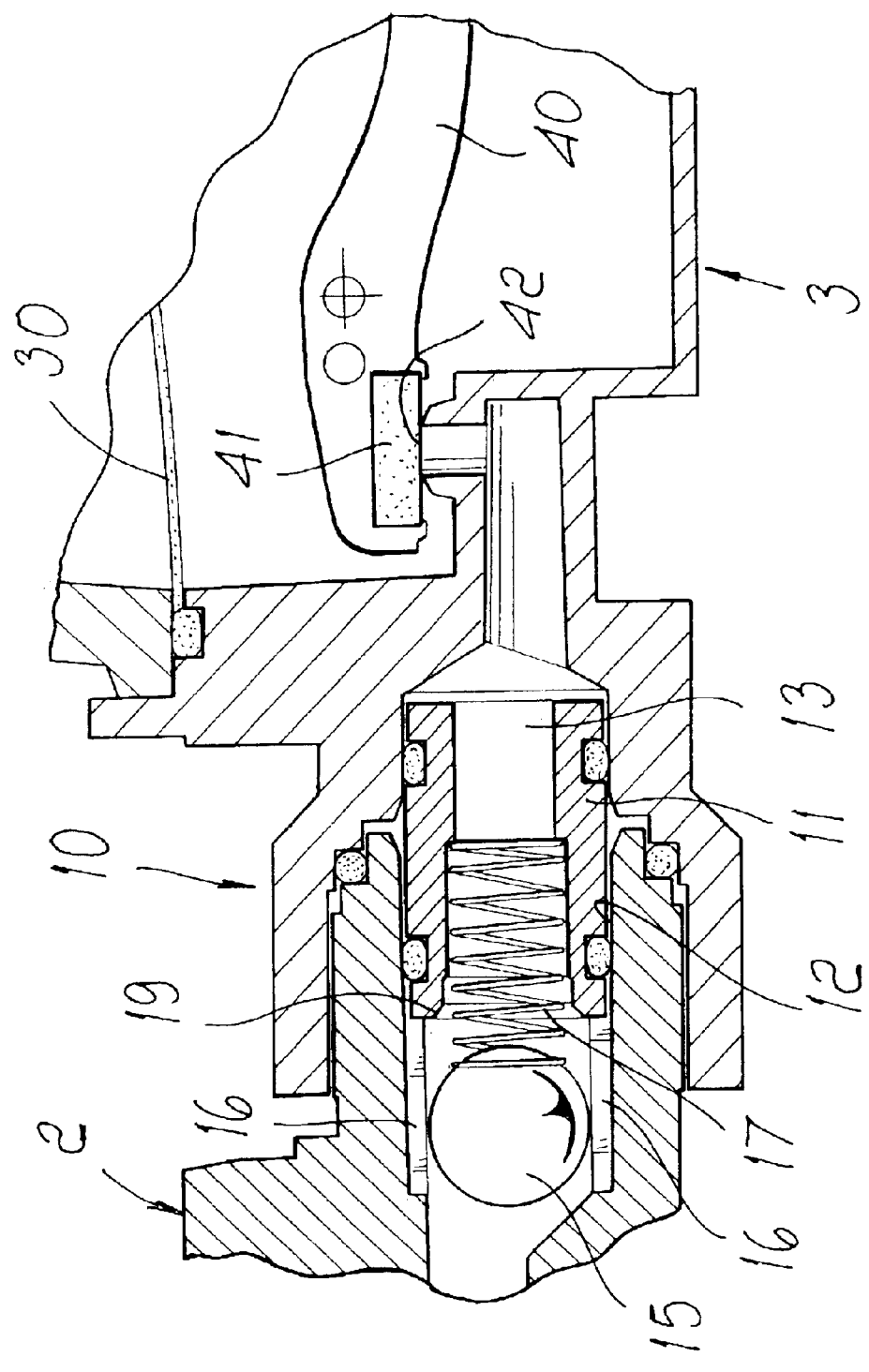
FIG. 2 is a sectional view of the flow limiter.
Figure 3:
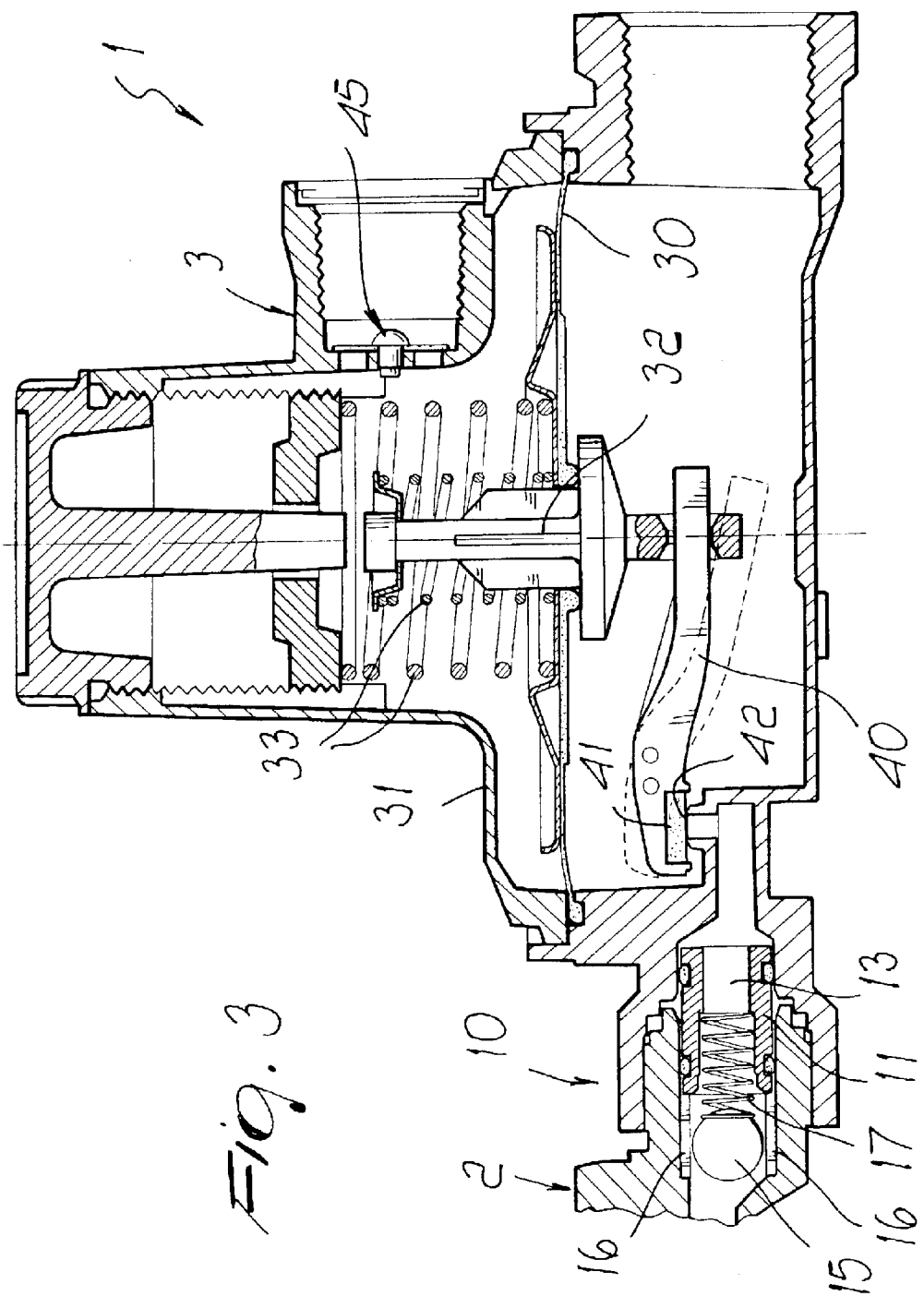
FIG. 3 is a sectional view of the second regulation stage in normal operating conditions.

With reference to the figures, the device for regulating the flow of gas toward user equipment, generally designated by the reference numeral 1, comprises a first regulation stage 2, which is arranged externally, and a second regulation stage, designated by the reference numeral 3.

In the specific illustrated example, the first and second regulation stages are directly connected one another and arranged side by side; nothing changes conceptually if the first and second stages are physically spaced and connected by a connecting duct.

The particularity of the invention consists in that there is provided a flow limiter, generally designated by the reference numeral 10, which is interposed between the first stage 2 and the second stage 3 and is designed to act when a malfunction occurs in the second stage.

According to a preferred but not exclusive embodiment, the limiter 10 which is arranged at an outer casing 31 of the second stage, has a cylindrical bushing 11, which is accommodated hermetically in a seat 12 and forms an internal channel 13.

At the end of the bushing 11 that is directed toward the first stage there is a ball-type limiter 15, which is accommodated slidingly between radial spacer fins 16 and is pushed by a contrast spring 17.

If a malfunction occurs in the second stage and accordingly the pressure rises abnormally, the ball overcomes the elastic contrast applied by the spring 17 and arranges itself in abutment against a frustum-shaped flared portion 19 formed at the axial end of the bushing.

The second stage 3 is provided internally with a conventional membrane 30, which is connected to the casing 31 and engages centrally a stem 32 that is affected by conventional setting springs 33.

If a malfunction occurs, for example if an arm 40 that supports a gasket 41 that acts on a port 42 for connection to the first stage breaks, the occurrence of an overpressure moves the membrane upward, causing a consequent flow of gas toward a discharge valve 45.

In these conditions, the excessive flow of gas causes the intervention of the limiter with the ball which, by engaging the frustum-shaped flared portion 19, limits significantly the flow of gas and accordingly limits the quantity of gas evacuated externally.

It should be added to the above that the pressure in the second stage, even in case of malfunction, is kept below 140 millibars.

From the above description it is evident that the invention achieves the intended aim and objects, and in particular the fact is stressed that a regulation device is provided in which the presence of a limiter interposed between the first stage and the second stage allows to reduce significantly the quantity of gas that is sent toward the discharge in case of malfunction of a component of the second stage.

The invention thus conceived is susceptible of numerous modifications and variations, all of which are within the scope of the appended claims.

All the details may further be replaced with other technically equivalent elements.

In practice, the materials used, as well as the contingent shapes and dimensions, may be any according to requirements.

The disclosures in Italian Patent Application No. MI2002A001879 from which this application claims priority are incorporated herein by reference.

What is claimed is:

1. A device for regulating a flow of gas toward user equipment, comprising a first regulation stage and a second regulation stage which is arranged in an outer casing and which is arranged downstream in a direction of flow of the gas to be controlled, said first regulation stage being arranged externally of said outer casing of said second regulation stage, said device further comprising a flow limiter interposed between said first and second regulation stages and arranged externally of said outer casing of said second regulation stage and adapted to intervene if said second stage malfunctions, said second regulation stage having a value for discharging the flow of gas in case of malfunction.

2. The device according to claim 1, wherein said flow limiter is arranged at said outer casing of said second regulation stage.

3. The device according to claim 1, wherein said flow limiter is arranged on a duct for connection between said first regulation stage and said second regulation stage.

4. The device according to claim 1, wherein said flow limiter comprises a cylindrical bushing that is accommodated hermetically in a seat and forms an internal channel, a ball-type limiter being arranged at the end of said bushing that is directed toward the first stage and being slidingly accommodated between radial spacer fins and pushed by a contrast spring.

5. The device according to claim 4, wherein said bushing has a frustum-shaped flared portion at the end where said bail-type limiter is provided.

6. The device according to claim 1, wherein the pressure of the gas at the outlet of said second regulation stage is lower than 140 millibars.

* * * * *